(12) United States Patent
Richardson et al.

(10) Patent No.: US 9,353,767 B2
(45) Date of Patent: May 31, 2016

(54) STATOR ANTI-ROTATION DEVICE

(71) Applicant: UNITED TECHNOLOGIES CORPORATION, Hartford, CT (US)

(72) Inventors: Robert B. Richardson, Kennebunk, ME (US); Steven J. Ford, Sanford, ME (US); Kevin C. Eckland, Kennebunk, ME (US); Kishore Kumar Madduri, Hyderabad (IN); Chandrashekar Vaddatti, Hubli (IN); Ramesh Ankam, Adilabad (IN)

(73) Assignee: United Technologies Corporation, Hartford, CT (US)

( * ) Notice: Subject to any disclaimer, the term of this patent is extended or adjusted under 35 U.S.C. 154(b) by 554 days.

(21) Appl. No.: 13/736,122

(22) Filed: Jan. 8, 2013

(65) Prior Publication Data
US 2014/0193251 A1    Jul. 10, 2014

(51) Int. Cl.
| | |
|---|---|
| *F01D 25/24* | (2006.01) |
| *F04D 29/64* | (2006.01) |
| *F04D 29/54* | (2006.01) |
| *F01D 9/04* | (2006.01) |

(52) U.S. Cl.
CPC ............. *F04D 29/644* (2013.01); *F01D 9/042* (2013.01); *F01D 25/246* (2013.01); *F04D 29/542* (2013.01); *Y02T 50/673* (2013.01); *Y10T 29/49323* (2015.01)

(58) Field of Classification Search
CPC ..... F01D 25/243; F01D 25/246; F01D 9/042; F01D 29/542; F01D 29/644
IPC ..................................................... F01D 25/243
See application file for complete search history.

(56) References Cited

U.S. PATENT DOCUMENTS

| | | | | |
|---|---|---|---|---|
| 3,056,583 | A * | 10/1962 | Varadi et al. | 415/209.2 |
| 4,522,559 | A | 6/1985 | Burge et al. | |
| 4,632,634 | A | 12/1986 | Vinciguerra et al. | |
| 4,856,963 | A | 8/1989 | Klapproth et al. | |
| 5,004,402 | A | 4/1991 | Burchette et al. | |
| 5,584,654 | A | 12/1996 | Schaefer et al. | |
| 5,846,050 | A * | 12/1998 | Schilling | 415/135 |
| 6,174,129 | B1 * | 1/2001 | Mazzola et al. | 415/127 |
| 6,537,022 | B1 | 3/2003 | Housley et al. | |
| 6,585,479 | B2 | 7/2003 | Torrance | |
| 7,032,904 | B2 | 4/2006 | Rogers | |
| 7,144,218 | B2 | 12/2006 | Dube et al. | |
| 8,128,354 | B2 * | 3/2012 | Hansen et al. | F01D 5/225 415/191 |
| 2003/0082051 | A1 | 5/2003 | Bertrand et al. | |
| 2006/0153683 | A1 | 7/2006 | Dube et al. | |
| 2008/0107530 | A1 | 5/2008 | Bart et al. | |
| 2009/0293496 | A1 | 12/2009 | Norris et al. | |
| 2010/0266399 | A1 | 10/2010 | Hansen et al. | |
| 2010/0278631 | A1 | 11/2010 | Heda et al. | |
| 2011/0008165 | A1 | 1/2011 | Ottow et al. | |

OTHER PUBLICATIONS

International Search Report and Written Opinion for PCT Application No. PCT/US2014/010166, mailed Oct. 27, 2014.
International Preliminary Report on Patentability for International Application No. PCT/US2014/010166 mailed Jul. 23, 2015.
European Search Report for EP Application No. 147741524 dated Dec. 15, 2015.

* cited by examiner

*Primary Examiner* — Richard Edgar
(74) *Attorney, Agent, or Firm* — Carlson, Gaskey & Olds, P.C.

(57) ABSTRACT

A stator vane assembly for a gas turbine engine is disclosed and includes a plurality of vanes received within channels defined within a case. An anti-rotation plate extends from a flange of the case between adjacent ones of the plurality of vanes for preventing rotation of the plurality of vanes relative to the case.

10 Claims, 6 Drawing Sheets

STATOR ANTI-ROTATION DEVICE

BACKGROUND

A gas turbine engine typically includes a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor. Gas turbine engines installed aircraft can include a fan section driven by the turbine section to provide additional thrust. Ground based industrial gas turbine engines typically drive a generator through a shaft.

The compressor section typically includes a plurality of stages made up of rotating blades and fixed stator vanes. The stator vanes are supported within channels defined within a case and are exposed to circumferential aerodynamic loads in direction that potentially causes rotation of the stator vanes. Anti-rotation features are therefore installed to prevent rotation and maintain a desired orientation of the stator vanes. Such anti-rotation features can require specially fabricated features within both the case and on some of the stator vanes that can complicate assembly and increase cost.

Gas turbine engine manufactures are continually seeking ways to reduce cost and simplify assembly and therefore is desirable to develop anti-rotation features that reduce cost and ease assembly.

SUMMARY

A compressor section of a gas turbine engine according to an exemplary embodiment of this disclosure, among other possible things includes a case including a first flange attached to a second flange parallel to an engine axis, a stator vane assembly including a plurality of vanes received within channels defined within the case, and an anti-rotation plate extending from one of the first flange and the second flange between adjacent ones of the plurality of vanes for preventing rotation of the stator vane assembly.

In a further embodiment of the foregoing compressor section, one of the first flange and the second flange includes a recess receiving the anti-rotation plate.

In a further embodiment of any of the foregoing compressor sections, the anti-rotation plate disposed within the recess even with or below a face of the flange.

In a further embodiment of any of the foregoing compressor sections, the case includes two flange interfaces each including the first flange on a first case half and the second flange on a second case half and an anti-rotation plate.

In a further embodiment of any of the foregoing compressor sections, one of the anti-rotation plates is disposed within a first flange at a first one of the two flange interfaces and another of the anti-rotation plates is disposed in a second flange of the other of the two flange interfaces.

In a further embodiment of any of the foregoing compressor sections, the recess includes a slot opening to an inner chamber within the case and a mount portion radially outward of the slot with the plate extending through the slot into the inner chamber.

In a further embodiment of any of the foregoing compressor sections, each of the plurality of vanes includes a platform section including a side parallel with engine axis with the anti-rotation plate abutting the side parallel with the engine axis.

In a further embodiment of any of the foregoing compressor sections, each of the plurality of vanes includes hooks mounted within the channels with the anti-rotation plate abutting a side of the hooks within the channels.

A stator vane assembly for a gas turbine engine according to an exemplary embodiment of this disclosure, among other possible things includes a plurality of vanes received within channels defined within a case, and an anti-rotation plate extending from a flange of the case between adjacent ones of the plurality of vanes for preventing rotation of the plurality of vanes relative to the case.

In a further embodiment of the foregoing stator vane assembly, each of the plurality of vanes includes a platform section including a side parallel with an engine axis with the anti-rotation plate abutting the side parallel with the engine axis.

In a further embodiment of any of the foregoing stator vane assemblies, each of the plurality of vanes includes hooks mounted within the channels with the anti-rotation plate abutting a side of the hooks within the channels.

In a further embodiment of any of the foregoing stator vane assemblies, the anti-rotation plate includes a mount portion disposed within the flange and a key portion extending radially inward the adjacent ones of the plurality of vanes.

In a further embodiment of any of the foregoing stator vane assemblies, the mount portion includes an axial length greater than an axial length of the key portion.

A method of assembling a stator vane assembly for a gas turbine engine according to an exemplary embodiment of this disclosure, among other possible things includes assembling a plurality of stator vanes into channels defined within a case, and placing an anti-rotation plate into a recess defined within an axially extending flange of the case such that a portion of the anti-rotation plate extends radially inward between adjacent ones of the plurality of stator vane assemblies.

In a further embodiment of the foregoing method, includes abutting one first side of the anti-rotation plate with a side of one of the plurality of stator vanes and abutting a second side of the anti-rotation plate with a side of another of plurality of stator vanes.

In a further embodiment of any of the foregoing methods, includes securing the anti-rotation plate within the recess with a threaded fastener.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
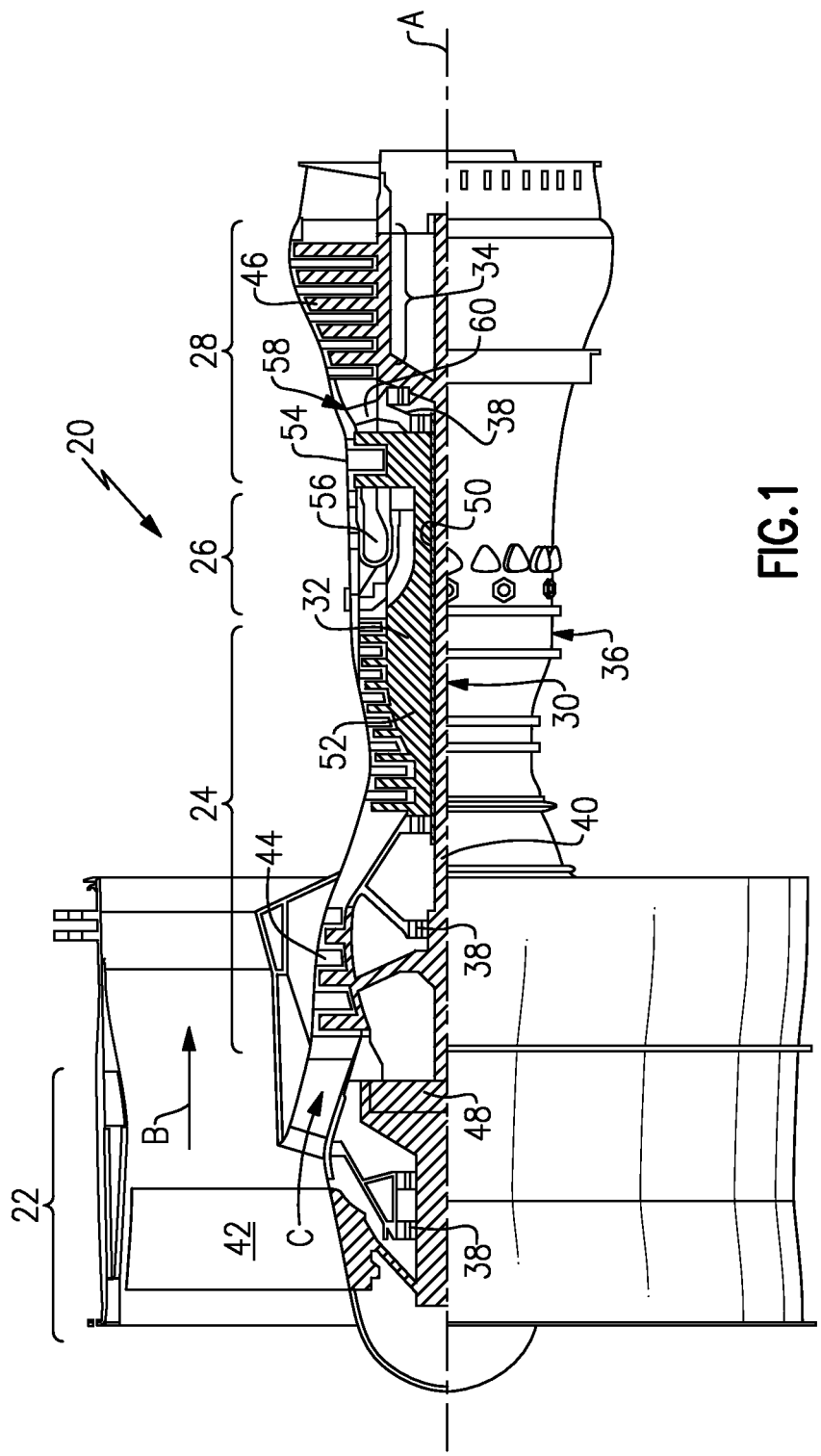
FIG. 1 is a schematic view of an example gas turbine engine.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\,°\,R)/518.7)^{0.5}]$. The "Low corrected fan tip speed", as disclosed herein according to one non-limiting embodiment, is less than about 1150 ft/second.

The example gas turbine engine includes the fan 42 that comprises in one non-limiting embodiment less than about 26 fan blades. In another non-limiting embodiment, the fan section 22 includes less than about 20 fan blades. Moreover, in one disclosed embodiment the low pressure turbine 46 includes no more than about 6 turbine rotors schematically indicated at 34. In another non-limiting example embodiment the low pressure turbine 46 includes about 3 turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

Figure 2:
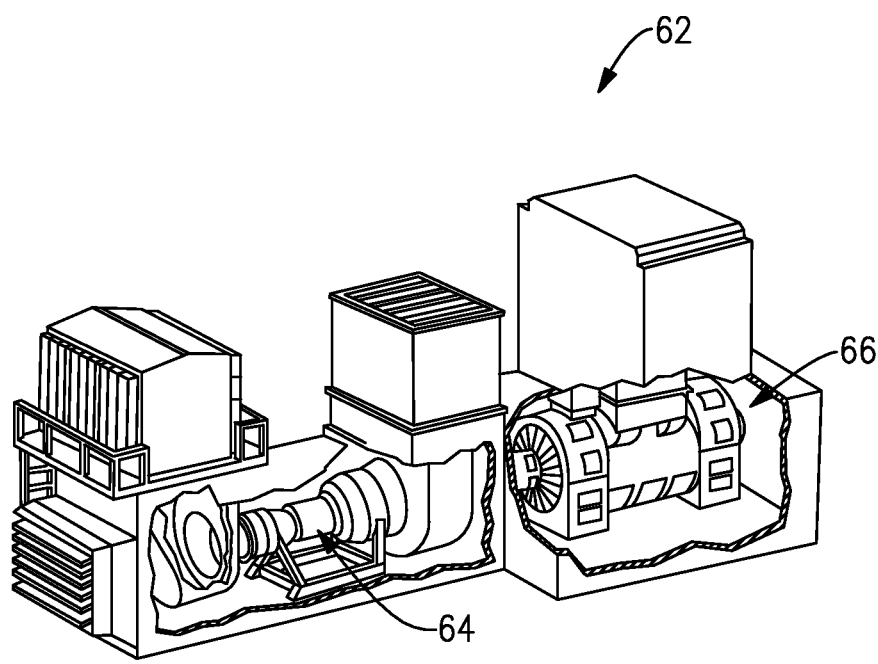
FIG. 2 is an example view of an industrial gas turbine engine.

Referring to FIG. 2, an example industrial gas turbine engine assembly 62 includes a gas turbine engine 64 that is mounted to a structural land based frame to drive a generator 66. The example gas turbine engine 64 includes many of the same features described in the gas turbine engine 20 illustrated in FIG. 1 and operates in much the same way. The land based industrial gas turbine engine 62, however, may include additional features such as a shaft to drive the generator 66 and is not constrained by the same weight restrictions that apply to an aircraft mounted gas turbine engine. As appreciated, many of the parts that are utilized in an aircraft and land based gas turbine engine are common and therefore both aircraft based and land based gas turbine engines are within the contemplation of this disclosure.

Figure 3:
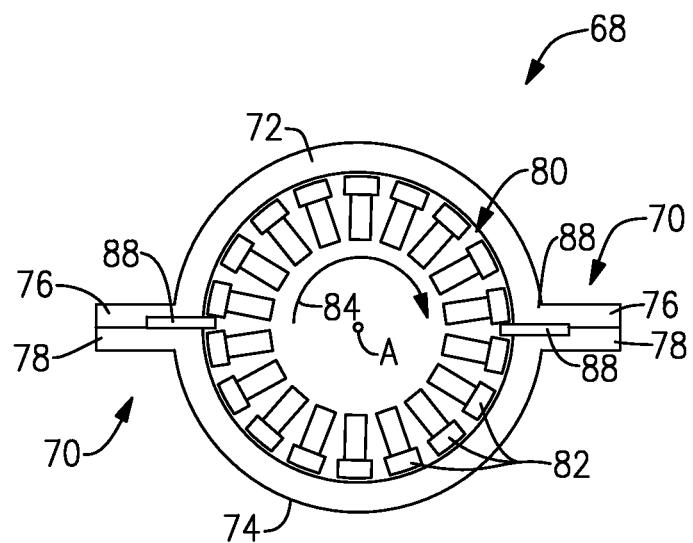
FIG. 3 is a cross-sectional view of an example compressor section.

Referring to FIG. 3, an example compressor case 68 includes a first part 72 and a second part 74 that are attached at a flange connection 70. The first half 72 includes a first flange 76 and the second half 74 includes a second flange 78. The first flange 76 is attached to the second flange 78 at the flange connection 70. Disposed within the case 68 is a stator vane assembly 80 that includes a plurality of stator vanes 82.

Figure 4:
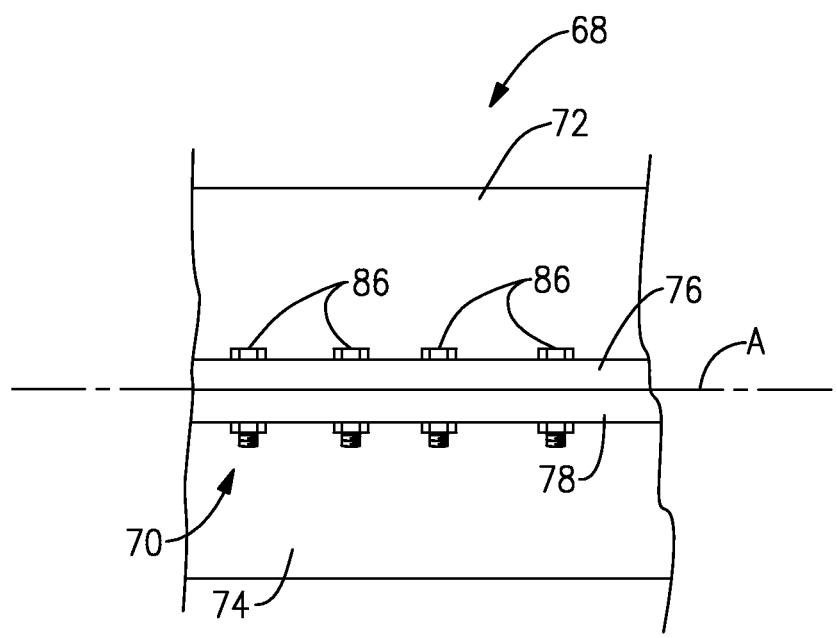
FIG. 4 is a side view of a portion of the example compressor section.

Referring to FIG. 4 with continued reference to FIG. 3, the flange connection 70 is disposed parallel to the engine axis A and extends along the case in the axial direction. Fasteners 86 are utilized to secure the first flange 76 to the second flange 78.

Aerodynamic forces within the gas turbine engine 20, 64 generated by gas flow and air flow through the compressor section 24 generate circumferential loads on the fixed stator vanes 82. The stator vanes 82 are mounted in a fixed circumferential position. However airflow through the stator vanes 82 generates the circumferential load in a direction indicated by the arrow 84. Although in this example the circumferential load is shown in a generally clockwise direction, depending on the configuration of the specific engine, the circumferential load 84 may be exerted in an anti-clockwise direction. Moreover, although the example load 84 is indicated in a circumferential direction there may be an axial component to the forces. However, the axial loads exerted on the stator vanes 82 are accommodated by channels disposed within the case 68.

Figure 5:
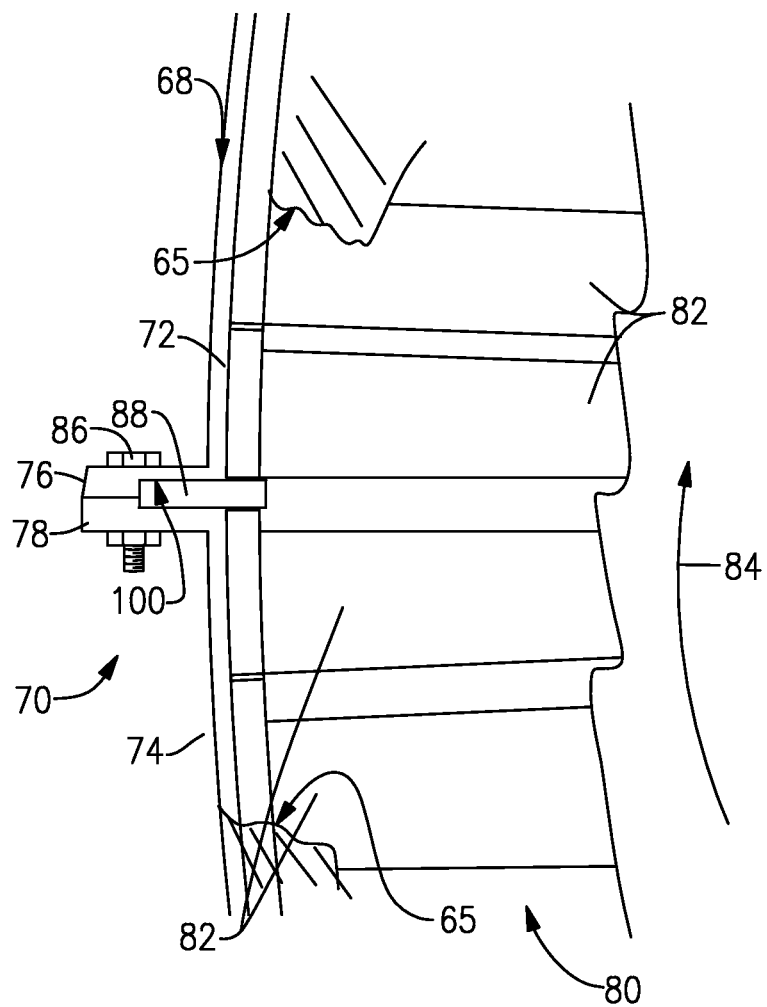
FIG. 5 is a schematic view of a portion of an example compressor case.
Figure 6:
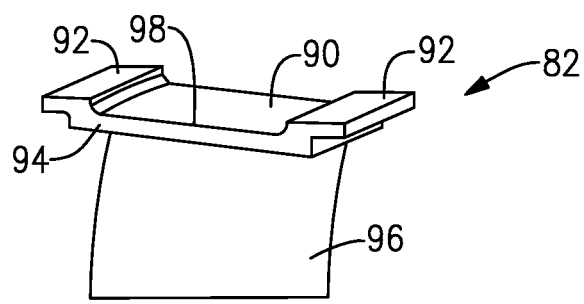
FIG. 6 is a perspective view of an example stator vane.

Referring to FIGS. 5 and 6 with continued reference to FIG. 3, the example stator vanes 82 are mounted within channels 65 defined within the case 68. The channels 65 received hooks 92 (FIG. 6) that extend from a platform 90 of each of the individual stator vanes 82. Each of the example stator vanes 82 is identical in configuration. The identical configuration extends to an identical airfoil 96 and platform 90. Each of the platforms 90 includes the hooks 92 that are received within channels 65. The platform 90 also defines sides 94. The sides 94 are generally disposed in a direction that is parallel to the engine axis A.

Figure 7:
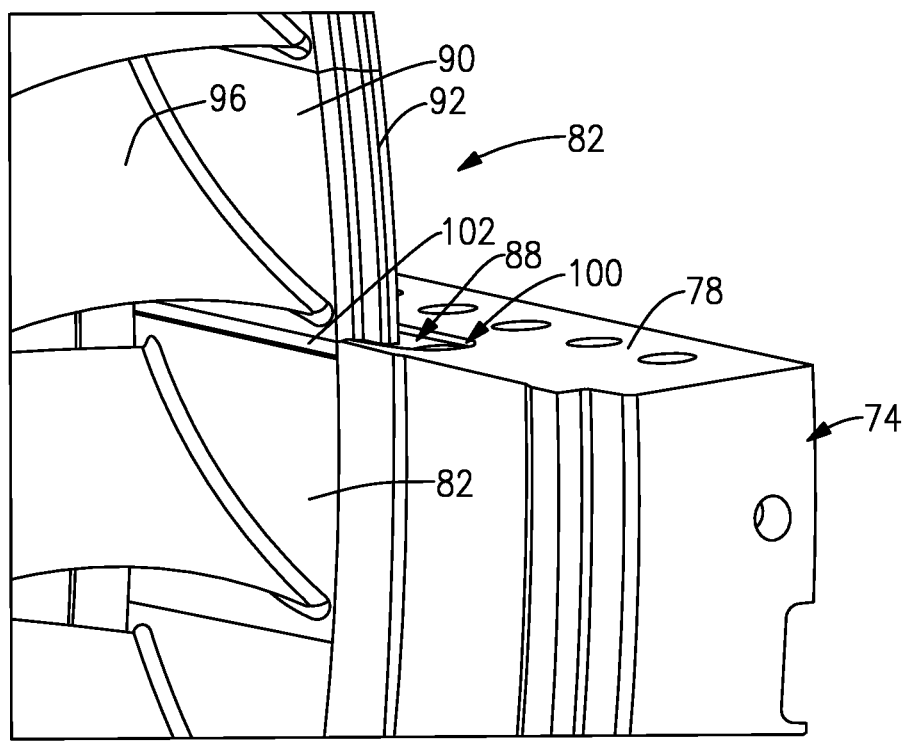
FIG. 7 is an example view of a recess within a flange.
Figure 8:
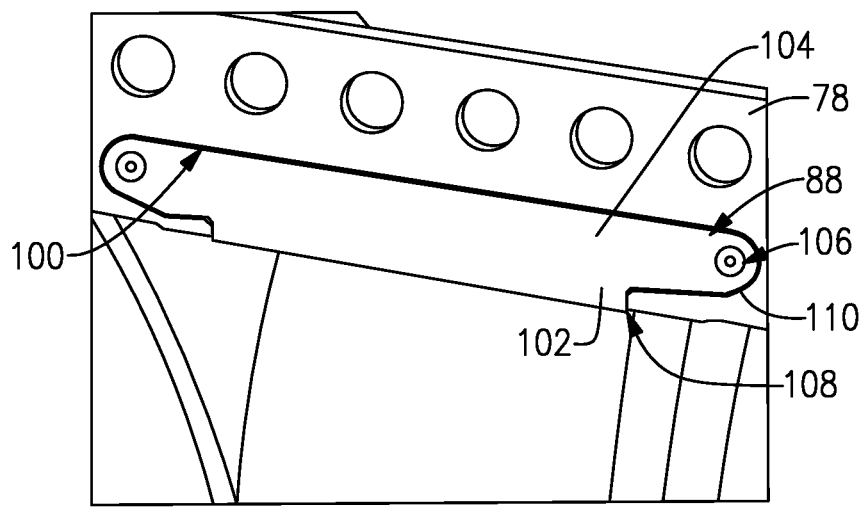
FIG. 8 is a front view of an example flange including an anti-rotation plate.

Referring to FIGS. 7 and 8, with continued reference to FIG. 5, rotation in a direction indicated by the arrow 84 is prevented by anti-rotation plates 88 that are received within a recess 100 defined within flanges 76 and 78. The anti-rotation plate 88 includes a mount portion 104 that is received within the recess 100. The mount portion 104 is that portion of the anti-rotation plate 88 that remains within the flange 78. The anti-rotation plate 88 also includes a key portion 102 that extends radially inward from the case 68 between adjacent stator vanes 82. The radially inward extending portion or key 102 extends between adjacent vanes 82 to prevent rotation caused by the circumferential loads. Moreover, the key portion 102 extends between adjacent vanes 82 to contact a side surface 94 and define a load bearing area 98. The load bearing area 98 comprises the side surface 94 including those portions of the side that are part of the hooks 92. Accordingly, loads from the vanes 82 are transferred to the key portion 102 through the bearing area 98 that includes the entire side surface of the platform 90.

The anti-rotation plate 88 is secured within in the recess by way of fasteners 106. The example anti-rotation plate 88 is received within a recess defined in one of the flanges that comprise the flange connection 70. The side or flange of the flange connection 70 in which the recess 100 and the anti-rotation plate 88 resides is dependent on the direction of the circumferential loads 84. As appreciated, the circumferential loads 84 exert a load on the vanes 82 in a direction indicated by the arrow 84. The anti-rotation plate 88 is disposed within one of the corresponding flanges 76, 78 such that any loads will be directed through the anti-rotation plate 88 to the one of the flanges 76, 78. In other words, the direction of the circumferential load is considered in mounting of the anti-rotation plate 88 so that circumferential loads are not be exerted on the fasteners 106 that hold the plate 88 within the recess 100. Accordingly, on one side of the case 68, the first flange 76 receives the plate 88 such that circumferential forces will push the anti-rotation plate 88 into the flange 76. A second anti-rotation plate 88 is disposed in the second flange 78 such that the circumferential forces will push the anti-rotation plate 88 into the second flange 78.

Figure 9:
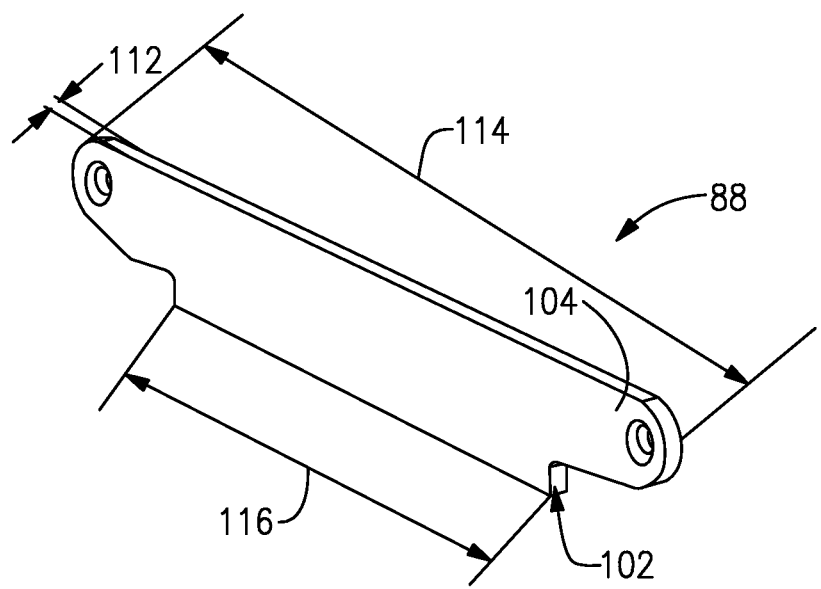
FIG. 9 is a perspective view of the example anti-rotation plate.

Referring to FIGS. 8 and 9, the example anti-rotation plate 88 includes the mount portion 104 and the key portion 102. The mount portion 104 includes a width 114 that is greater than a width 116 of the key portion 102. The increased width of the mount portion 104 will hold the anti-rotation plate 88 within the corresponding flange 76, 78 regardless of whether the fasteners 106 are attached or not.

The recess 100 includes the mount section 110 that receives the mount portion 110 of the anti-rotation plate 88. The recess 100 further includes the slot 108 through which the key 102 extends radially inward to abut a side surface 94 of adjacent vanes 82.

The anti-rotation plate 88 includes a thickness 112 that is equal to or less than the depth of the recess 100 within the flange 78. This provides for the anti-rotation plate 88 to always be recessed or lower than the surface of the flange 78 such that the anti-rotation plate 88 does not interfere with assembly and sealing of the flange connections 70.

Accordingly, the example anti-rotation device provides the compressor assembly and a stator assembly with anti-rotation features that counter circumferential loads that is simple and cost effective to assemble while maintaining a desired position of the accompanying vane assemblies.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A compressor section of a gas turbine engine comprising:
   a case including a first flange attached to a second flange parallel to an engine axis;
   a stator vane assembly including a plurality of vanes received within channels defined within the case, wherein each of the plurality of vanes includes a platform section including a side parallel with the engine axis and hooks mounted within the channels; and
   an anti-rotation plate extending from one of the first flange and the second flange between adjacent ones of the plurality of vanes and abutting the side parallel with the engine axis for preventing rotation of the stator vane assembly, the anti-rotation plate including a mount portion disposed within a recess within one of the first flange and the second flange and a key portion extending radially inward between adjacent ones of the plurality of vanes, wherein the mount portion includes a width greater than the key portion with the anti-rotation plate abutting a side of the hooks within the channels.

2. The compressor section as recited in claim 1, wherein the anti-rotation plate disposed within the recess even with or below a face of the flange.

3. The compressor section as recited in claim 1, wherein the case includes two flange interfaces each including the first flange on a first case half and the second flange on a second case half and an anti-rotation plate.

4. The compressor section as recited in claim 3, wherein one of the anti-rotation plates is disposed within a first flange at a first one of the two flange interfaces and another of the anti-rotation plates is disposed in a second flange of the other of the two flange interfaces.

5. The compressor section as recited in claim 1, wherein the recess comprises a slot opening to an inner chamber within the case and a mount section radially outward of the slot with the key portion of the anti-rotation plate extending through the slot into the inner chamber.

6. A stator vane assembly for a gas turbine engine comprising:
    a plurality of vanes received within channels defined within a case, wherein each of the plurality of vanes includes a platform section including a side parallel with an engine axis and hooks mounted within the channels; and
    an anti-rotation plate extending from a flange of the case between adjacent ones of the plurality of vanes and abutting the side parallel with the engine axis for preventing rotation of the plurality of vanes relative to the case, the anti-rotation plate includes a mount portion disposed within the flange and a key portion extending radially inward the adjacent ones of the plurality of vanes with the anti-rotation plate abutting a side of the hooks within the channels, wherein the mount portion includes an axial length greater than an axial length of the key portion.

7. A method of assembling a stator vane assembly for a gas turbine engine comprising:
    assembling a plurality of stator vanes into channels defined within a case;
    placing an anti-rotation plate into a recess defined within an axially extending flange of the case such that a key portion of the anti-rotation plate extends radially inward between adjacent ones of the plurality of stator vane assemblies;
    securing a mount portion of the anti-rotation plate within the recess with a threaded fastener, wherein the mount portion includes an axial length greater than an axial length of the key portion and securing the mount portion includes securing the mount portion within a mount section of the recess that is axially longer than a slot portion through which the key portion extends for controlling radial movement of the plurality of stator vanes; and
    abutting one first side of the anti-rotation plate with a side of one of the plurality of stator vanes and abutting a second side of the anti-rotation plate with a side of another of plurality of stator vanes.

8. The compressor section as recited in claim 5, wherein the mount section includes an axial length greater than an axial length of the slot.

9. The compressor section as recited in claim 8, wherein the mount portion includes axial ends that extend outward axially from both ends beyond the axial length of the key and fasteners securing the anti-rotation plate within the mount section are disposed within the axial ends.

10. The stator vane assembly as recited in claim 6, wherein the wherein the mount portion includes axial ends that extend outward axially from both ends beyond the axial length of the key and fasteners securing the anti-rotation plate within the mount section are disposed within the axial ends.

* * * * *

UNITED STATES PATENT AND TRADEMARK OFFICE
CERTIFICATE OF CORRECTION

| | | |
|---|---|---|
| PATENT NO. | : 9,353,767 B2 | Page 1 of 1 |
| APPLICATION NO. | : 13/736122 | |
| DATED | : May 31, 2016 | |
| INVENTOR(S) | : Robert B. Richardson et al. | |

It is certified that error appears in the above-identified patent and that said Letters Patent is hereby corrected as shown below:

IN THE CLAIMS:

In claim 10, column 8, line 33; delete "wherein the"

Signed and Sealed this
Twenty-sixth Day of July, 2016

Michelle K. Lee
*Director of the United States Patent and Trademark Office*